United States Patent
Naffziger et al.

(10) Patent No.: US 6,820,167 B2
(45) Date of Patent: Nov. 16, 2004

(54) CONFIGURABLE CROSSBAR AND RELATED METHODS

(75) Inventors: Samuel David Naffziger, Fort Collins, CO (US); Eric DeLano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 10/147,193

(22) Filed: May 16, 2002

(65) Prior Publication Data

US 2003/0217221 A1 Nov. 20, 2003

(51) Int. Cl.[7] .............................................. G06F 13/00
(52) U.S. Cl. ...................... 710/317; 710/38; 370/380
(58) Field of Search .......................... 710/36, 38, 316, 710/317; 370/352, 357, 380, 388, 396, 360; 709/232; 712/11

(56) References Cited

U.S. PATENT DOCUMENTS

| | | | |
|---|---|---|---|
| 5,832,303 A | * | 11/1998 | Murase et al. ................. 710/36 |
| 6,011,791 A | * | 1/2000 | Okada et al. ................ 370/352 |
| 6,035,414 A | | 3/2000 | Okazawa et al. |
| 6,212,591 B1 | | 4/2001 | Kaplinsky |
| 6,597,692 B1 | * | 7/2003 | Venkitakrishnan .......... 370/380 |
| 6,633,580 B1 | * | 10/2003 | T.o slashed.rudbakken et al. ......................... 370/461 |

FOREIGN PATENT DOCUMENTS

| | | |
|---|---|---|
| JP | 04113445 | 4/1992 |
| JP | 11296473 | 10/1999 |

OTHER PUBLICATIONS

US 2003/0135291, DeLano, Jul. 17, 2003.*
Institut National de la Propriete Industrielle, Preliminary Search Report, Mar. 19, 2004 (3 pages).

* cited by examiner

Primary Examiner—Khanh Dang

(57) ABSTRACT

A processing system crossbar includes control sub-ports and mini-ports selectively configurable as connection points. Each control sub-port has a domain of mini-ports that the control sub-port is configured to selectively control. Each mini-port is configurable to select a control sub-port from those having domains that include the selecting mini-port. Each connection point includes a corresponding control sub-port and each mini-port selecting the corresponding control sub-port. The crossbar provides bandwidth tailored for various system agents. Thus crossbar bottlenecks are eliminated or reduced.

17 Claims, 2 Drawing Sheets

CONFIGURABLE CROSSBAR AND RELATED METHODS

FIELD OF THE INVENTION

The present invention relates generally to processing systems and, more particularly, to a crossbar for use in a processing system, wherein the crossbar is configurable for transferring bit width between crossbar usage paths.

BACKGROUND OF THE INVENTION

A crossbar is a chip or chip component commonly used to provide high-frequency links among a plurality of sources and destinations in a VLSI (very large scaled integration) based processing system. When used in a multiprocessor system, a crossbar typically provides a fixed amount of bandwidth at each crossbar port, allowing only a certain number of bits per second to be transferred from a source to a destination. In a multiprocessor system, however, utilization levels for processors typically vary according to the particular jobs, i.e. programs, the processors are assigned to execute. Additionally, other network agents such as input/output (I/O) controllers, memory controllers and cache memory, located, for example, on separate VLSI chips, are commonly connected to one another through crossbars. Performance of heavily utilized processors and bandwidth-intensive system agents, e.g. cache memory controllers delivering data to many processors, could be improved if crossbar connections were to provide higher bandwidths than those currently available.

Thus a need exists for a crossbar that can be configured to provide relatively less bandwidth for relatively less bandwidth-intensive system agents, and to provide relatively more bandwidth for agents needing more bandwidth for optimal performance. It can be expensive, however, in terms of engineering effort and schedule to develop a VLSI chip, particularly a high-frequency custom design. Thus it would be desirable to design flexibility into existing VLSI chips so that they can be put to use in a variety of applications.

SUMMARY OF THE INVENTION

In one preferred form, the invention is directed to a crossbar for providing connections among a plurality of system agents such as processors, memories and controllers. The crossbar includes a plurality of control sub-ports and a plurality of mini-ports selectively configurable as a plurality of connection points for providing the connections. Each control sub-port includes a domain of mini-ports that the control sub-port is configured to selectively control. Each mini-port is configurable to select one from a plurality of the control sub-ports having domains that include the selecting mini-port. Each of the connection points includes a corresponding one of the control sub-ports and each mini-port selecting the corresponding control sub-port.

The above crossbar can be configured to provide amounts of bandwidth specifically tailored to the performance needs of various system agents to be connected across the crossbar. Thus bottlenecks across the crossbar can be eliminated or reduced, and overall performance of the processing system can be enhanced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
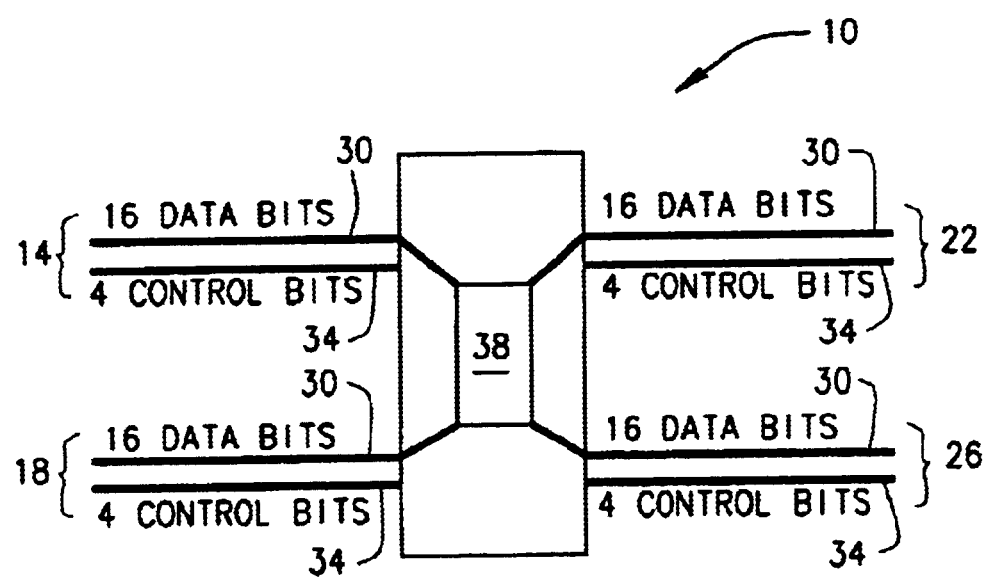
FIG. 1 is a schematic diagram of a simplified conventional crossbar.

A simplified crossbar of the prior art is generally indicated by reference number 10 in FIG. 1. Four ports 14, 18, 22 and 26 allow up to four system agents (not shown), including but not limited to processors, memory controllers, cache memory and input/output controllers, to link with one another via the crossbar 10. Each of the ports 14, 18, 22 and 26 has a total bit width of twenty bits configured into a sixteen-bit data connection 30 and a four-bit control connection 34. The control bits 34 typically are used, for example, to negotiate a connection between one of the ports 14 and 18 and one of the ports 22 and 26 and to specify the length of a transmission over such a connection.

System agents are connected through the crossbar 10 via a switch 38, typically a multiplexer switching configuration internal to the crossbar 10. A crossbar switch connection typically has a bit width matching a data bit width of the ports being connected. For the exemplary crossbar 10, the switch connection bit width is sixteen bits. Because the switching bit widths are fixed, however, bandwidths available to agents connected via the switch 38 also tend to be fixed. Thus transfer delays can occur, particularly over highly utilized connections. The term "bandwidth" as used herein refers to a bit-per-second transfer rate of data from one location to another. Generally, if a connection via a crossbar is N bits wide and operates at a bandwidth of X bits per second, M bits of data will complete transmission in M/(N*X) seconds. Thus, for a fixed amount of data, a transfer delay could be reduced by increasing the bit width N.

Figure 2:
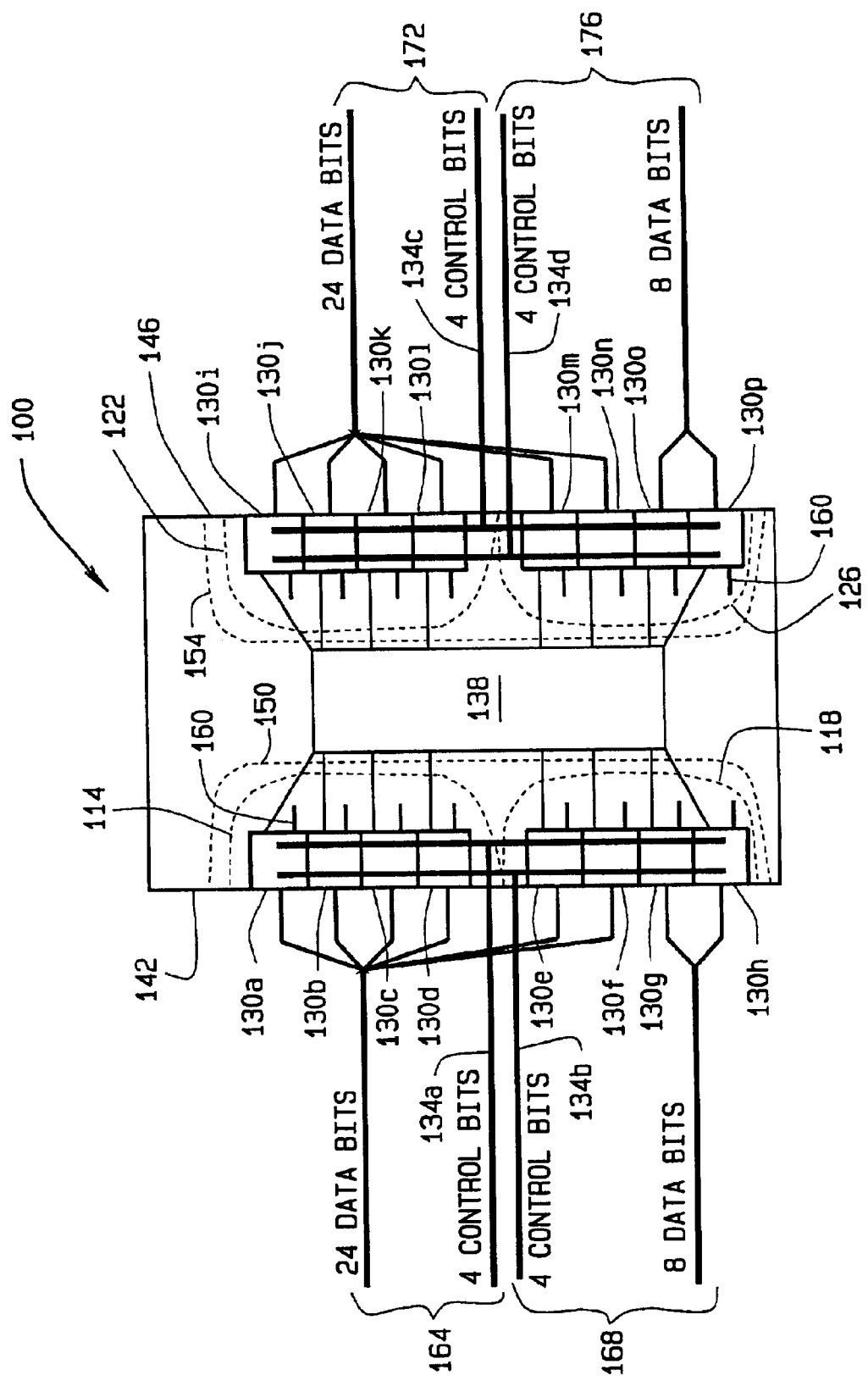
FIG. 2 is a schematic diagram of a crossbar in accordance with one embodiment of the present invention.

An embodiment of a crossbar configured in accordance with principles of the present invention is indicated by reference number 100 in FIG. 2. The crossbar 100 includes four ports 114, 118, 122 and 126. Each of the ports 114, 118, 122 and 126 includes a plurality of data mini-ports 130 having equal bit widths. In the embodiment shown in FIG. 2, each mini-port 130 has a bit width of four bits. Specifically, the port 114 includes mini-ports 130a–130d, the port 118 includes mini-ports 130e–130h, the port 122 includes mini-ports 130i–130l, and the port 126 includes mini-ports 130m–130p.

Each of the ports 114, 118, 122 and 126 also has a control bit width of four bits, i.e. a four-bit control connection or control sub-port 134 which shall be further described below. Specifically, the port 114 includes control sub-port 134a, the port 118 includes control sub-port 134b, the port 122 includes control sub-port 134c and the port 126 includes control sub-port 134d. It should be noted that the term "control sub-port", as used herein and in the claims, includes explicit control sub-ports and implicit control sub-ports. An implicit control sub-port includes data bits extracted as defined by a protocol to carry control information. In an explicit control sub-port, data bit width is not defined as control bit width. Both explicit and implicit control sub-ports are contemplated in embodiments of the present invention. A multiplexer switch 138 internal to the crossbar 100 selectively connects data signals between mini-ports 130 on a crossbar side 142 and mini-ports 130 on a crossbar side 146.

Each of the control sub-ports 134 is configured to selectively control a domain of mini-ports 130 as further described below. Specifically, as shown in FIG. 2, the control sub-ports 134a and 134b are each separately configurable to control a mini-port domain 150 that may include the mini-ports 130a–130h. The control sub-ports 134c and 134d are each separately configurable to control a domain 154 that may include the mini-ports 130i–130p.

Each mini-port 130 includes a select line or select sub-port 160 by which a control sub-port 134 that includes a given mini-port 130 in its domain can be selected for controlling data signals via the given mini-port 130. Each select sub-port 160 can be set, for example, by hard wiring or by system programming option. Thus the mini-ports 130 can be configured with the control sub-ports 134 to provide a relatively wide data bit width for a relatively high-use path, and a relatively narrow data bit width for a relatively low-use path, through the crossbar 100.

For example, as shown in FIG. 2, the mini-ports 130 are configured with the control sub-ports 134 as connection points 164, 168, 172 and 176 by which up to four system agents (not shown) can be connected to the crossbar 100. The connection points 164 and 172 are configured for transferring twenty-four-bit wide data signals, and the connection points 168 and 176 are configured for eight-bit wide data signals. For example, on the crossbar side 142, the connection point 164 has a data bit width of twenty-four bits when the select lines 160 of the mini-ports 130a, 130b, 130c, 130d, 130e and 130f are signaled to select for control by the control sub-port 134a. On the other crossbar side 146, the connection point 172 also has a bit width of twenty-four bits when the select lines 160 of the mini-ports 130i, 130j, 130k, 130l, 130m and 130n are signaled to select for control by the control sub-port 134c. Thus the corresponding connection points 164 and 172 can provide a twenty-four-bit data connection over the crossbar 100. The connection point 168 on the crossbar side 142 has a bit width of eight bits when the select lines 160 of the mini-ports 130g and 130h are signaled to select for control by the control sub-port 134b. The corresponding connection point 176 has a bit width of eight bits when the select lines 160 of the mini-ports 130o and 130p are signaled to select for control by the control sub-port 134d. Thus the connection points 168 and 176 can provide an eight-bit data connection through the crossbar 100.

It is to be noted that no changes need be made to the switch 138 when configuring the connection points 164, 168, 172 and 176. Additionally, it should be understood that alternative pluralities and configurations of ports, mini-ports, mini-port domains, select sub-ports and/or control sub-ports are contemplated in other embodiments. For example, for a crossbar having P ports and Q mini-ports per port, a domain size could range between one mini-port and P*Q/2 mini-ports inclusively. For the embodiment shown in FIG. 2, the number of ports P is 4, the number of mini-ports per port Q is 4, and domain size P*Q/2 is 8 mini-ports. It also is contemplated that port and connection point bit widths, control port bit widths and/or mini-port bit widths alternative to those shown in FIG. 2 can be utilized in other embodiments.

Referring to the crossbar 100 as configured as shown in FIG. 2, an embodiment of a method shall now be described, for increasing available bit width for providing a connection between two system agents via the crossbar 100. The method includes configuring a number of the mini-ports 130a through 130h to select to be controlled by the control sub-port 134a, the number of mini-ports 130 being sufficient to provide a desired bit width at the connection point 164. Thus, for a desired bit width of twenty-four bits, six mini-ports 130 are configured with the control sub-port 134a as the connection point 164. Configuring the mini-ports 130 includes programming a signal for input to a select sub-port 160 for each of the six mini-ports 130. The method also includes configuring a corresponding number of the mini-ports 130i through 130p to select to be controlled by the control sub-port 134c, the corresponding number being sufficient to provide the desired bit width at the connection point 172. Thus six mini-ports 130 are configured with the control sub-port 134c as the connection point 172. The two system agents then are connected to the crossbar at the connection points 164 and 172 respectively.

When the crossbar 100 is configured as shown in FIG. 2, it can be seen that system agents connected to the crossbar 100 at the connection points 164 and 172 operate with fifty percent more bandwidth than would be available using the conventional crossbar 10. On the other hand, available bandwidth is fifty percent lower for agents connected at the connection points 168 and 176 of the crossbar 100 than would be available using the conventional crossbar 10. If, for example, a memory controller and a high-performance processor were connected respectively to the connection points 164 and 172 while relatively less bandwidth-intensive input/output controllers were connected to the connection points 168 and 176, the crossbar 100 would provide relatively more bandwidth for those agents utilizing relatively more bandwidth. Thus bottlenecks across the crossbar can be eliminated or reduced, and overall performance of the processing system can be enhanced.

Additionally, the above crossbar 100 can be fabricated easily using existing standard crossbar configurations. When used in applications in which the select sub-ports 160 can be reprogrammed, the crossbar 100 is easily configurable to accommodate bandwidth needs of various system agents.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A crossbar for providing connections among a plurality of system agents comprising processors, memories and controllers, the crossbar comprising a plurality of control sub-ports and a plurality of mini-ports selectively configurable as a plurality of connection points for providing the connections;

wherein each control sub-port comprises a domain of mini-ports which the control sub-port is configured to selectively control, and each mini-port is configurable to select one from a plurality of the control sub-ports comprising domains that include the selecting mini-port; and wherein each of the configured connection points comprises a corresponding one of the control sub-ports and each mini-port selecting the corresponding control sub-port.

2. The crossbar of claim 1 wherein the configured connection points comprise unequal bit widths.

3. The crossbar of claim 2 wherein the mini-ports comprise equal bit widths.

4. The crossbar of claim 1 further comprising a switch for transferring data from one of the connection points to a corresponding one of the connection points.

5. The crossbar of claim 1 wherein the selecting mini-ports of a first connection point are configured for connection through the crossbar to corresponding selecting mini-ports of a second connection point.

6. The crossbar of claim 1 wherein each mini-port comprises a select sub-port configured for selecting one of two control sub-ports configured to control the selecting mini-port.

7. The crossbar of claim 1 wherein each mini-port is configurable by at least one of hard wiring and a programming option to select one from a plurality of the control sub-ports.

8. The crossbar of claim 1 wherein each control sub-port can deliver a signal to each of the mini-ports in the control sub-port domain.

9. A crossbar for providing signal connections among a plurality of system agents comprising processors, memories and controllers, the crossbar comprising a plurality of ports, each port comprising a control sub-port and a plurality of mini-ports;

wherein each of the mini-ports is configured to select to be controlled by a control sub-port of one of the ports that does not comprise the selecting mini-port; and wherein a given one of the control sub-ports, when selected by a mini-port of one of the ports that does not comprise the given control sub-port, is configured to control a signal passing through the selecting mini-port;

the crossbar further comprising a plurality of connection points, each connection point configured from a corresponding control sub-port and each miniport selecting the corresponding control sub-port.

10. The crossbar of claim 9 wherein two of the connection points are configured for transmission of signals of unequal bit width.

11. The crossbar of claim 9 wherein the mini-ports comprise equal bit widths.

12. The crossbar of claim 9 wherein each of the mini-ports comprises a select sub-port configured for selecting one of the control sub-ports.

13. The crossbar of claim 9 further comprising a switch configured to transfer a signal between a first of the ports and a second of the ports.

14. The crossbar of claim 13 wherein a first of the connecting points is configured with a second of the connecting points to connect a first system agent with a second system agent through the switch.

15. A method for increasing available bit width for a connection between a first system agent and a second system agent via a crossbar, wherein the crossbar includes first and second ports on a first crossbar side and third and fourth ports on a second crossbar side, each port including a plurality of mini-ports and a control sub-port, the control sub-ports of the first and second ports each configured to selectively control signaling through the mini-ports of the first and second ports, each mini-port of the first and second ports configurable to select to be controlled by either of the control sub-ports of the first and second ports, the control sub-ports of the third and fourth ports each configured to selectively control signaling through the mini-ports of the third and fourth ports, each mini-port of the third and fourth ports configurable to select to be controlled by either of the control sub-ports of the third and fourth ports, the method comprising the steps of:

configuring a number of the mini-ports of the first and second ports to select to be controlled by the control sub-port of the second port, the number being sufficient to provide a desired bit width at a first connection point;

configuring a corresponding number of the mini-ports of the third and fourth ports to select to be controlled by the control sub-port of the fourth port, the corresponding number being sufficient to provide the desired bit width at a second connection point; and connecting the first agent at the first connection point and the second agent at the second connection point.

16. The method of claim 15 wherein the step of configuring a number of the mini-ports comprises programming a signal for input to a select sub-port for each of the number of mini-ports.

17. The method of claim 15 further comprising the step of configuring the mini-ports for switching data signals between the agents at a desired bandwidth.

* * * * *